United States Patent
Jiang et al.

(10) Patent No.: US 12,154,034 B2
(45) Date of Patent: Nov. 26, 2024

(54) PRUNING METHOD BASED ON CROSSBAR ARCHITECTURE AND SYSTEM THEREOF

(71) Applicant: Shanghai Jiao Tong University, Shanghai (CN)

(72) Inventors: Li Jiang, Shanghai (CN); Chaoqun Chu, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 176 days.

(21) Appl. No.: 17/291,727

(22) PCT Filed: Mar. 1, 2021

(86) PCT No.: PCT/CN2021/078444
§ 371 (c)(1),
(2) Date: May 6, 2021

(87) PCT Pub. No.: WO2021/213010
PCT Pub. Date: Oct. 28, 2021

(65) Prior Publication Data
US 2023/0032432 A1  Feb. 2, 2023

(30) Foreign Application Priority Data
Apr. 20, 2020 (CN) .......................... 202010310388.0

(51) Int. Cl.
*G06N 3/082* (2023.01)
*G06N 3/065* (2023.01)
(52) U.S. Cl.
CPC .............. *G06N 3/082* (2013.01); *G06N 3/065* (2023.01)

(58) Field of Classification Search
CPC ....... G06N 3/0464; G06N 3/065; G06N 3/082
See application file for complete search history.

(56) References Cited

U.S. PATENT DOCUMENTS

| | | | |
|---|---|---|---|
| 2018/0046916 A1* | 2/2018 | Dally | G06N 3/045 |
| 2018/0336468 A1* | 11/2018 | Kadav | G06N 3/045 |
| 2018/0373978 A1* | 12/2018 | Yu | G06N 3/08 |

(Continued)

OTHER PUBLICATIONS

Liang et al., "Crossbar-Aware Neural Network Pruning", published on Oct. 8, 2018 by IEEEAccess, pp. 14 (Year: 2018).*

(Continued)

*Primary Examiner* — Chau T Nguyen
(74) *Attorney, Agent, or Firm* — Nicholas Mesiti; HESLIN ROTHENBERG FARLEY & MESITI P.C.

(57) ABSTRACT

The present disclosure relates to a pruning method based on a crossbar architecture and a system thereof, wherein the method comprises the steps of: carrying out structured pruning on a weight matrix to be processed at the current layer of a neural network without considering architecture factors to obtain a first weight matrix, wherein the weight matrix is the weight matrix of the neural network; determining the pruning scheme according to the size of the first weight matrix and the size of the crossbar, wherein the pruning scheme comprises: block-based structured pruning, crossbar row pruning and crossbar column pruning; and pruning the first weight matrix according to the pruning scheme to obtain a second weight matrix, wherein the second weight matrix is mapped to the crossbar array in an accelerator, and the neural network is accelerated by the accelerator.

6 Claims, 8 Drawing Sheets

(a) situation of selecting crossbar row pruning (b) situation of selecting crossbar COLUMN pruning (c) situation of selecting block-based structured pruning

(56) References Cited

U.S. PATENT DOCUMENTS

| | | | |
|---|---|---|---|
| 2020/0356843 A1* | 11/2020 | Strachan | G06N 3/082 |
| 2021/0110235 A1* | 4/2021 | Hoang | G06N 3/045 |
| 2021/0125071 A1* | 4/2021 | Ren | G06N 3/082 |
| 2021/0150362 A1* | 5/2021 | Zhang | G06N 3/082 |

OTHER PUBLICATIONS

Chu et al., "PIM-Prune: Fine-Grain DCNN Pruning for Crossbar-based Process-In-Memory Architecture", published in 2020 by IEEE, pp. 6 (Year: 2020).*

Ma et al., "PCONV: The missing but Desirable Sparsity in DNN Weight Pruning for Real-Time Execution on Mobile Devices", published on Apr. 3, 2020, Association for the Advancement of Artificial Intelligence (www.aaai.org), pp. 9 (Year: 2020).*

* cited by examiner

The structured pruning is carried out on a weight matrix to be processed at the current layer of a neural network without considering architecture factors to obtain a first weight matrix.

The pruning scheme is determined according to the size of the first weight matrix and the size of the crossbar.

The first weight matrix is pruned according to the pruning scheme to obtain a second weight matrix.

FIG. 3

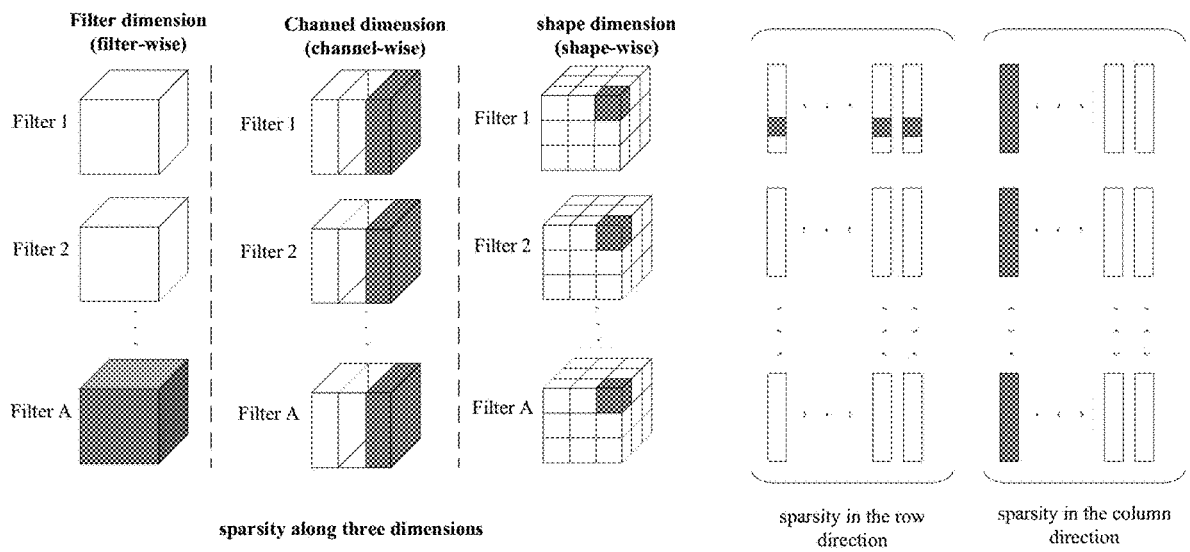

FIG. 4

(a) situation of selecting crossbar row pruning (b) situation of selecting crossbar COLUMN pruning (c) situation of selecting block-based structured pruning

PRUNING METHOD BASED ON CROSSBAR ARCHITECTURE AND SYSTEM THEREOF

CROSS REFERENCE TO RELATED APPLICATIONS

This application is a continuation of PCT Application No. PCT/CN2021/078444 filed Mar. 1, 2021, entitled "Pruning Method Based On Crossbar Architecture And System Thereof," which claims the priority of Chinese Patent Application No. 202010310388.0 filed on Apr. 20, 2020 and entitled "A Pruning Method Based On A Crossbar Architecture And A System Thereof," which the entire contents of both are incorporated in this application by reference.

TECHNICAL FIELD

The present disclosure relates to the field of network acceleration, in particular to a pruning method based on a crossbar architecture and a system thereof.

BACKGROUND

At present, Deep Neural Network (DNN) is widely used in fields such as image classification, object detection, semantic segmentation and speech recognition. However, due to the large weight size and computation amount of mainstream neural network, many neural network accelerators are designed to accelerate the inference process of network by taking advantage of the parallelism of computation of a convolution layer and a full connection layer in neural network. One typical accelerator is the vector-matrix multiplication accelerator based on a crossbar architecture.

FIG. 1 is an architecture diagram of a typical neural network accelerator based on a crossbar architecture. The chip contains a plurality of tiles, and each tile consists of a plurality of interconnected cores. There is a crossbar and some peripheral circuits inside each core. During calculation, each cell in the crossbar can complete multiplication operation at the same time, and the multiplication results on the same column can be easily accumulated, so that this architecture can be used to accelerate the inference of neural network.

FIG. 2 is a schematic diagram of a crossbar architecture accelerator completing convolution calculation. It is assumed that this convolution layer has two 2*2 filters, a 4*2 weight matrix can be obtained after img2col conversion, and each column of the weight matrix represents a filter. In addition, it is assumed that there are two 2*4 crossbars, and each cell can represent 2 bits. These weights can be represented by 4 bits, so this weight matrix can be mapped to these two crossbars in the way shown in FIG. 2. Each weight will be stored in two cells, and the weights belonging to the same filter will be stored in the same column in different crossbars according to the corresponding relationship. The input of these filters is the same. For example, if the input of the first cycle of these filters is the content in the 2*2 box in the feature graph, its corresponding input will also be converted into a 4*1 vector, in which the first two rows are sent to the first crossbar and the last two rows are sent to the second crossbar. These cells can perform multiplication operation at the same time and the calculation results on the same column can be accumulated. Therefore, the neural network accelerator based on a crossbar architecture can take advantage of the parallelism of calculation of the convolution layer to fully accelerate convolution calculation. The full connection layer can also be processed in a similar way.

Because of the large model size of typical neural network, a lot of crossbar resources will be consumed when accelerating an actual network by using an accelerator based on a crossbar architecture. Neural network pruning is an effective method to reduce the model size. Many studies show that there are many redundant elements in the weights of neural network. In the training process, these redundant elements can be searched and pruned by sparse algorithm (i.e., being set to 0), and the accuracy of neural network will not decrease substantially. In the prior work, the weight of each column in each crossbar is taken as the basic pruning granularity, and the remaining columns are shifted to the left and supplemented. This method finally obtains the pruning result. On the one hand, the algorithm only uses the sparsity in the column direction of the neural network weight matrix, but cannot use the sparsity in the row direction, so that its compression ratio will be limited. On the other hand, most of the cells in some crossbars are in idle state after the remaining weights in pruning results are left shifted to the left and supplemented in the algorism, which wastes hardware resources.

SUMMARY

The purpose of the present disclosure is to provide a pruning method based on a crossbar architecture and a system thereof, so as to reduce the occupation of resources of the crossbar and reduce the waste of hardware resources.

To achieve the above purpose, the present disclosure provides the following scheme.

A pruning method based on a crossbar architecture comprises: carrying out structured pruning on a weight matrix to be processed at the current layer of a neural network without considering architecture factors to obtain a first weight matrix, wherein the weight matrix to be processed is the weight matrix of the neural network, and each column of the weight matrix to be processed represents a filter; determining the pruning scheme according to the size of the first weight matrix and the size of the crossbar, wherein the pruning scheme comprises: block-based structured pruning, crossbar row pruning and crossbar column pruning; and pruning the first weight matrix according to the pruning scheme to obtain a second weight matrix, wherein the second weight matrix is mapped to the crossbar array in an accelerator, and the neural network is accelerated by the accelerator.

Preferably, subsequent to carrying out structured pruning on a weight matrix to be processed at the current layer of a neural network without considering architecture factors to obtain a first weight matrix, the method further comprises: post-processing the neural network according to the first weight matrix of the current layer and compressing the neural network.

Preferably, post-processing the neural network according to the first weight matrix of the current layer and compressing the neural network specifically comprises: when the kth filter of the current layer is deleted, deleting the weight of the kth channel in the next layer of the current layer; when the kth channel of the current layer is deleted, deleting the kth filter in the previous layer of the current layer.

Preferably, determining the pruning scheme according to the size of the first weight matrix and the size of the crossbar specifically comprises: calculating the ratio of the width of the first weight matrix to the width of the crossbar to obtain a first numerical value; calculating the ratio of the height of the first weight matrix to the height of the crossbar to obtain a second numerical value; comparing the size relationship between the first numerical value and the ratio threshold and the size relationship between the second numerical value and the ratio threshold; when the first numerical value is greater than the ratio threshold and the second numerical value is greater than the ratio threshold, determining the block-based structured pruning as a pruning scheme; when the first numerical value is great than the ratio threshold and the second numerical value is not greater than the ratio threshold, determining the crossbar column pruning as a pruning scheme; when the first numerical value is not great than the ratio threshold and the second numerical value is larger than the ratio threshold, determining the crossbar row pruning as a pruning scheme; when the first numerical value is smaller than the ratio threshold and the second numerical value is smaller than the ratio threshold, determining the crossbar column pruning or the crossbar row pruning as a pruning scheme.

Preferably, pruning the first weight matrix according to the pruning scheme to obtain a second weight matrix specifically comprises: determining a weight distribution matrix corresponding to each crossbar when the first weight matrix is mapped to a crossbar array in the accelerator, wherein when the first weight matrix is mapped to each crossbar in the crossbar array in the accelerator, the mapping rule is the same as that when the initial weight matrix to be processed is mapped to the crossbar array; uniformly dividing the first weight matrix into x*y blocks when the pruning scheme is block-based structured pruning, wherein the size of the block is larger than the size of the crossbar, and the number of mapped crossbars in the crossbar array in the accelerator is x*y; carrying out structured pruning on each block according to the size of the crossbar to obtain the second weight matrix; when the pruning scheme is crossbar column pruning, determining the column importance measurement factor of each column weight in the weight distribution matrix corresponding to each crossbar; deleting the column weight with the column importance measurement factor smaller than the column threshold, and moving all the columns on the right side of the deleted column in the weight distribution matrix leftwards to the blank position where the deleted column is located to obtain the second weight matrix, wherein the column threshold is adjustable; when the pruning scheme is crossbar row pruning, determining the row importance measurement factor of each row weight in the weight distribution matrix corresponding to each crossbar; deleting the row value with the row importance measurement factor smaller than the row threshold, and moving all the rows below the deleted row in the weight distribution matrix upwards to the blank position where the deleted row is located to obtain the second weight matrix, wherein the row threshold is adjustable.

Preferably, subsequent to pruning the first weight matrix according to the pruning scheme to obtain a second weight matrix, the method further comprises: using an XRST module to record the row sparsity of the second weight matrix, wherein the XRST module is located in the peripheral circuit of the crossbar, and the XRST module is configured to skip the input corresponding to the deleted row according to the row sparsity of the second weight matrix; using an XCST module to record the column sparsity of the second weight matrix, wherein the XCST module is located in the peripheral circuit of the crossbar, and the XCST module is configured to insert 0 into the output position corresponding to the deleted column according to the column sparsity of the second weight matrix, so as to restore the real positions of all outputs.

Preferably, in the process of carrying out structured pruning on each block according to the size of the crossbar to obtain the second weight matrix, the size of the structured pruning for each block is equal to the size of the crossbar.

The present disclosure further provides a pruning system based on a crossbar architecture, comprising: a structured pruning module, which is configured to carry out structured pruning on a weight matrix to be processed at the current layer of a neural network without considering architecture factors to obtain a first weight matrix, wherein the weight matrix is the weight matrix of the neural network; a pruning scheme determining module, which is configured to determine the pruning scheme according to the size of the first weight matrix and the size of the crossbar, wherein the pruning scheme comprises: block-based structured pruning, crossbar row pruning and crossbar column pruning; and a pruning module, which is configured to prune the first weight matrix according to the pruning scheme to obtain a second weight matrix, wherein the second weight matrix is mapped to the crossbar array in an accelerator, and the neural network is accelerated by the accelerator.

Preferably, the system further comprises: a post-processing module, which is configured to subsequent to carrying out structured pruning on a weight matrix to be processed at the current layer of a neural network without considering architecture factors to obtain a first weight matrix, when the kth filter of the current layer is deleted, delete the weight of the kth channel in the next layer of the current layer; and when the kth channel of the current layer is deleted, delete the kth filter in the previous layer of the current layer.

Preferably, the pruning scheme determining module specifically comprises: a first numerical value calculation unit, which is configured to calculate the ratio of the width of the first weight matrix to the width of the crossbar to obtain a first numerical value; a second numerical value calculation unit, which is configured to calculate the ratio of the height of the first weight matrix to the height of the crossbar to obtain a second numerical value; a comparing unit, which is configured to compare the size relationship between the first numerical value and the ratio threshold and the size relationship between the second numerical value and the ratio threshold; a first pruning scheme determining unit, which is configured to, when the first numerical value is greater than the ratio threshold and the second numerical value is greater than the ratio threshold, determine the block-based structured pruning as a pruning scheme; a second pruning scheme determining unit, which is configured to, when the first numerical value is great than the ratio threshold and the second numerical value is not greater than the ratio threshold, determine the crossbar column pruning as a pruning scheme; a third pruning scheme determining unit, which is configured to, when the first numerical value is not great than the ratio threshold and the second numerical value is larger than the ratio threshold, determine the crossbar row pruning as a pruning scheme; a fourth pruning scheme determining unit, which is configured to, when the first numerical value is smaller than the ratio threshold and the second numerical value is smaller than the ratio threshold, determine the crossbar column pruning or the crossbar row pruning as a pruning scheme.

According to the specific embodiment provided by the present disclosure, the present disclosure discloses the following technical effects.

According to the present disclosure, the hardware architecture adopts three fine-grained pruning schemes, and the fine granularity provides extra flexibility for pruning, thereby improving the compression ratio while maintaining the same accuracy. When specifically choosing a fine-grained pruning scheme, the algorithm will consider the hardware and software factors together, and analyze the contribution of pruning in each dimension to reducing the number of crossbars by analyzing the size of the weight matrix and the size of the crossbar, so as to choose the most suitable pruning scheme, thereby reducing the resource occupation of the crossbar and the waste of hardware resources. In addition, the present disclosure also considers the alignment factor when carrying out fine-grained pruning. For the block-based structured pruning method, each block can just occupy one crossbar after being pruned. For crossbar row pruning and crossbar column pruning, the pruning threshold can be dynamically adjusted during pruning, so that each crossbar can be filled as much as possible when the weight after completing pruning is mapped to the crossbar, thus solving the alignment problem.

In addition, in order to make full use of the sparsity of the neural network, the neural network is compressed as much as possible and the number of required crossbars is reduced. The present disclosure further compresses the neural network through the structured pruning post-processing scheme by using the input-output correspondence between the front and back layers of the neural network, and deletes some weights that cannot be deleted by the conventional pruning algorithm based on the importance measurement factor, thus greatly compressing the neural network and generating the sparsity that can be used by the crossbar architecture.

BRIEF DESCRIPTION OF THE DRAWINGS

In order to explain the embodiments of the present disclosure or the technical scheme in the prior art more clearly, the drawings needed in the embodiments will be briefly introduced hereinafter. Obviously, the drawings in the following description are only some embodiments of the present disclosure. For those skilled in the art, other drawings can be obtained according to these drawings without paying creative labor.

FIG. 3 is a flow diagram of a pruning method based on a crossbar architecture according to the present disclosure;

FIG. 4 is a schematic diagram of structured pruning without considering architectural factors according to the present disclosure;

DETAILED DESCRIPTION

Figure 1:
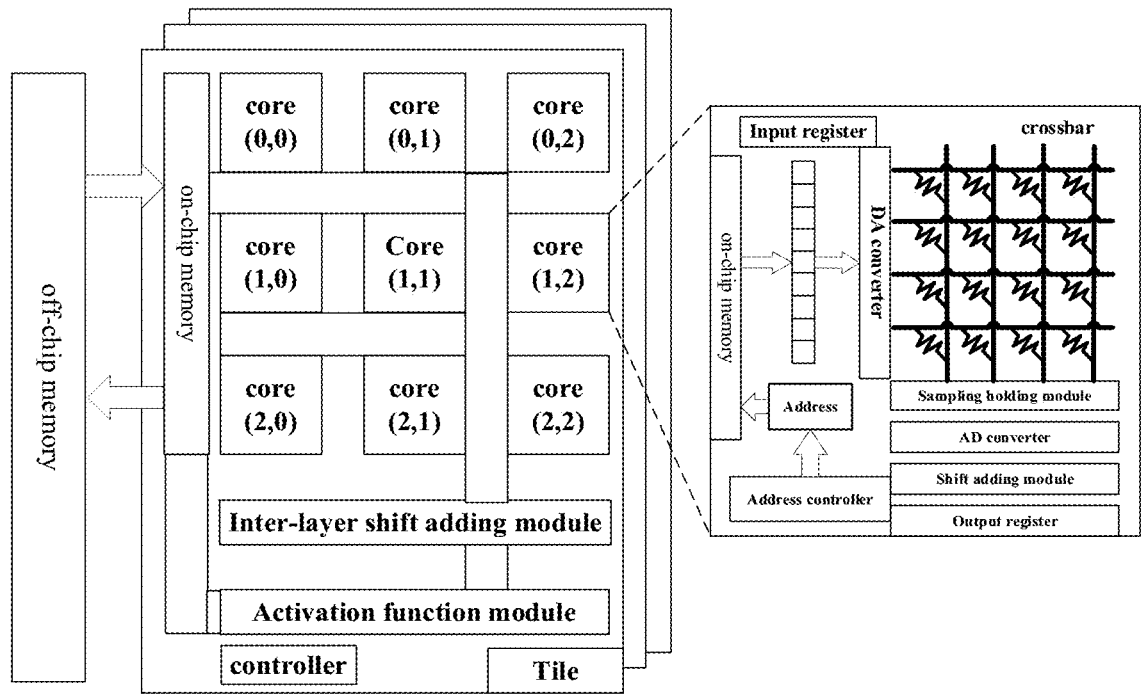
FIG. 1 is an architecture diagram of a neural network accelerator based on a typical crossbar architecture.
Figure 2:
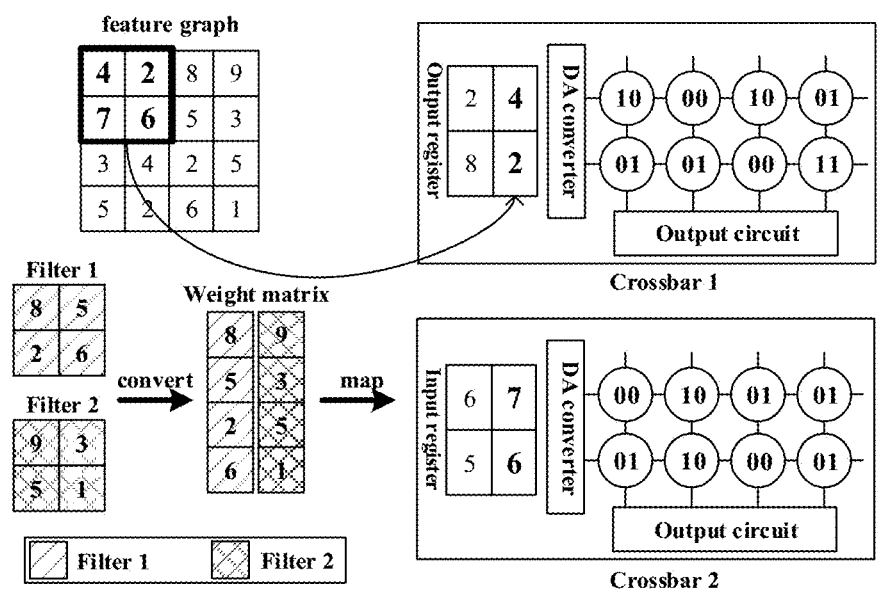
FIG. 2 is a schematic diagram of a crossbar architecture accelerator completing convolution calculation.

The technical scheme in the embodiments of the present disclosure will be described clearly and completely hereinafter with reference to the drawings in the embodiments of the present disclosure. Obviously, the described embodiments are only some embodiments of the present disclosure, rather than all of the embodiments. Based on the embodiments of the present disclosure, all other embodiments obtained by those skilled in the art without paying creative labor belong to the scope of protection of the present disclosure.

In order to make the above objects, features and advantages of the present disclosure more obvious and understandable, the present disclosure will be further explained in detail hereinafter with reference to the drawings and specific embodiments.

FIG. 3 is a flow diagram of a pruning method based on a crossbar architecture according to the present disclosure. As shown in FIG. 3, the pruning method based on a crossbar architecture according to the present disclosure comprises the following steps.

Step 100: The structured pruning is carried out on a weight matrix to be processed at the current layer of a neural network without considering architecture factors to obtain a first weight matrix. The weight matrix is the weight matrix of the neural network. FIG. 4 is a schematic diagram of structured pruning without considering architectural factors according to the present disclosure. As shown in FIG. 4, the original weight tensor in the left part of the figure can be converted into a two-dimensional weight matrix in the right part by img2col. Then, an importance measure factor (such as L1/L2 norm, entropy, mean value, variance, APoZ, etc. of its associated activation) is calculated for each row or column in the weight matrix, the importance measure factors of each row or column are sorted, and then some rows or columns with lower importance measure factors are deleted proportionally, such as the gray part in the right part. For example, starting from the rows, the importance measurement factors of each row are calculated, the importance measurement factors of all rows are then sorted, the rows with lower importance measurement factors are deleted according to the set ratio, the rows below the deleted rows move upwards to the blank position, and the weight matrix is updated. Then, starting from the columns, the importance measure factors of each column are calculated, the importance measure factors of all columns are then sorted, the columns with lower importance measure factors are deleted according to the set ratio, and the right column of the deleted columns move leftwards to the blank position.

Since a column of weights in the weight matrix correspond to a filter in the weight tensor, a column of the weight matrix is deleted, meaning that a filter of a weight is deleted, while a row of weights corresponds to elements at the same position of all filters, as shown in the shape dimension in FIG. 4. However, one channel of neural network weights is formed by multiple continuous weights. As shown in FIG. 4, each channel contains 3*3 continuous elements, which is reflected in the weight matrix that nine consecutive rows correspond to one channel. Obviously, the weight matrix pruned by this algorithm can always keep a regular shape, that is, the shape of the weight matrix is still rectangular, so that it can be correctly mapped to the crossbar array.

The weight matrix to be processed at the current layer of neural network is pruned structurally without considering architecture factors. After the first weight matrix is obtained, the pruned neural network needs to be post-processed, and the neural network is further compressed by using the input-output correspondence between the front and back layers of the neural network to delete some weights that cannot be deleted by the conventional pruning algorithm based on importance measurement factors. After structured pruning, some filters or channels in the original weight matrix are deleted. The result calculated by the kth filter in the ith layer will be sent to the (i+1)th layer and will be calculated with the kth channel in the (i+1)th layer. The structured pruning algorithm will prune all layers of the network structurally, and some channels and filters will be pruned in each layer. By post-processing, it is determined layer by layer whether any filters are cut off, if so, the corresponding channels in the next layer are cut off, and if the channels in this layer are cut off, the corresponding filters in the previous layer are cut off. Specifically, when the kth filter in the ith layer of neural network is deleted, the value of the kth channel in the output of this layer is 0, and the output of the ith layer is also the input of the (i+1)th layer, so that the weight of the kth channel in the (i+1)th layer is also deleted correspondingly. Similarly, if the kth channel in the (i+1)th layer of neural network is deleted, the kth filter in the previous layer is also deleted.

Figure 5:
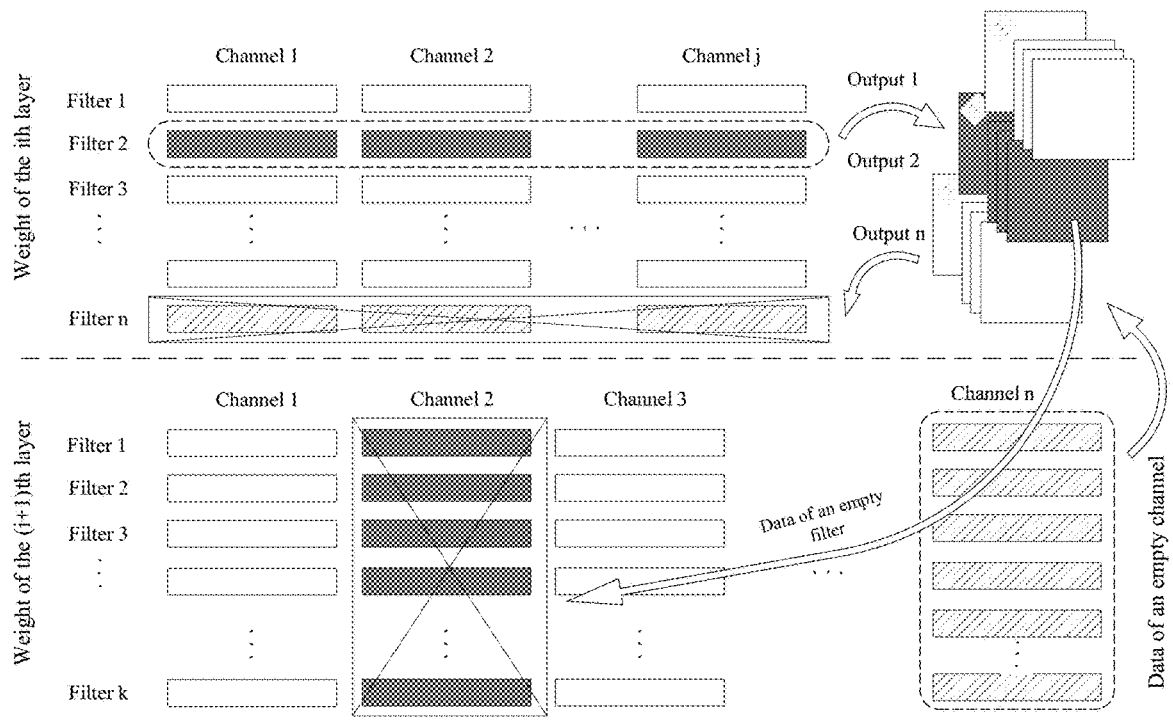
FIG. 5 is a schematic diagram of structured pruning post-processing according to the present disclosure.

FIG. 5 is a schematic diagram of structured pruning post-processing according to the present disclosure. As shown in FIG. 5, if the second filter in the ith layer is deleted, the value of the second channel in the output of this layer is 0, while the output of the ith layer is the input of the (i+1)th layer, that is, the input of the second channel in the (i+1)th layer is 0. Even though this channel value is important in the weight of the (i+1)th layer, its corresponding input is 0, and the calculation result on these channels is 0, so that the weight of the second channel in the (i+1)th layer can be deleted. Similarly, the nth channel in the (i+1) layer of the neural network is deleted, that is, the corresponding position weight is set to 0. At this time, regardless of the input value of this channel, the calculation result is 0. The input of this channel is the output generated by the second filter of the weight of the previous layer. Because the calculation result on this channel is unrelated to the input, that is, the output of the corresponding filter has no influence on the network, the nth filter in the ith layer can be deleted.

Step 200: The pruning scheme according to the size of the first weight matrix and the size of the crossbar is determined. The pruning scheme comprises: block-based structured pruning, crossbar row pruning and crossbar column pruning. The specific determining process is as follows: calculating the ratio of the width of the first weight matrix to the width of the crossbar to obtain a first numerical value; calculating the ratio of the height of the first weight matrix to the height of the crossbar to obtain a second numerical value; comparing the size relationship between the first numerical value and the ratio threshold and the size relationship between the second numerical value and the ratio threshold; when the first numerical value is greater than the ratio threshold and the second numerical value is greater than the ratio threshold, determining the block-based structured pruning as a pruning scheme; when the first numerical value is great than the ratio threshold and the second numerical value is not greater than the ratio threshold, determining the crossbar column pruning as a pruning scheme; when the first numeri- cal value is not great than the ratio threshold and the second numerical value is larger than the ratio threshold, determining the crossbar row pruning as a pruning scheme; when the first numerical value is smaller than the ratio threshold and the second numerical value is smaller than the ratio threshold, determining the crossbar column pruning or the crossbar row pruning as a pruning scheme.

Figure 6:
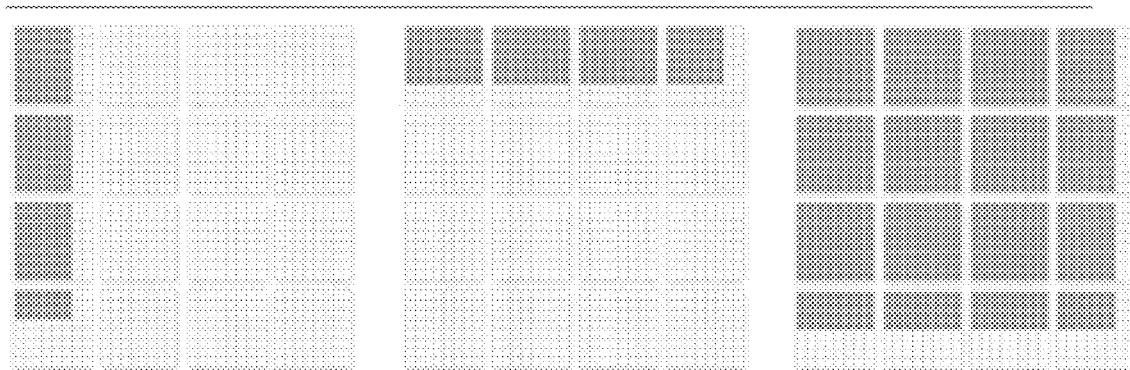
FIG. 6 is a schematic diagram for selecting three pruning schemes according to the present disclosure.

According to the actual situation, the specific value of the ratio threshold can be adaptively adjusted, for example, the ratio threshold can be 4. Generally, the first numerical value is smaller than the ratio threshold, representing that the width of the weight matrix and the width of the crossbar are of an order of magnitude, while the second numerical value is smaller than the ratio threshold, representing that the height of the weight matrix and the height of the crossbar are of an order of magnitude. FIG. 6 is a schematic diagram for selecting three pruning schemes according to the present disclosure. As shown in FIG. 6, the comparison between the first numerical value and the ratio threshold and the comparison between the second numerical value and the ratio threshold comprise four situations.

The first situation is shown in part (a) of FIG. 6, in which the first numerical value is not greater than the ratio threshold and the second numerical value is greater than the ratio threshold, that is, the width of the weight matrix and the width of the crossbar are of an order of magnitude. When the height of the weight matrix is much greater than that of the crossbar, the crossbar row pruning should be selected. For example, Resnet18 predicts the full connection layer of cifar10 data set, and its weight matrix size is 512*10. It is assumed that the size of the crossbar is 128*16. At this time, the situation in part (a) of FIG. 6 will appear. At this time, pruning in the column direction by neural network is useless to reduce the number of crossbars, and the crossbar row pruning scheme can provide the minimal pruning granularity in the row direction, so that crossbar row pruning should be selected at this time.

The second situation is shown in part (b) of FIG. 6, just opposite to part (a). At this time, the first numerical value is greater than the ratio threshold and the second numerical value is not greater than the ratio threshold, that is, the height of weight matrix and the height of a crossbar are of an order of magnitude, while the width is far greater than the width of a crossbar. The crossbar column pruning is used. For example, the 1*1 convolution layer in the third block of Resnet18 has a weight matrix size of 128*256 and a crossbar size of 128*16. At this time, the height of the weight matrix and the height of a crossbar are of an order of magnitude, and the width is much larger than the width of a crossbar. To reduce the number of crossbars, crossbar column pruning should be used.

The third situation is shown in part (c) of FIG. 6, in which the first numerical value is greater than the ratio threshold and the second numerical value is greater than the ratio threshold, that is, the weight matrix is much larger than the crossbar in both the row and column dimensions, and block-based structured pruning is used. For example, most of the 3*3 convolutions in Resnet18, such as the last convolution layer in Resnet18, has a weight matrix of 4608*512, which is much larger than the crossbar of 128*16. At this time, pruning in two dimensions is of great significance to reduce the number of crossbars. The block-based structured pruning scheme can provide a better pruning granularity in both row and column directions, so that the block-based structured pruning scheme should be used at this time.

The fourth situation is relatively rare. The first numerical value is smaller than the ratio threshold and the second numerical value is smaller than the ratio threshold, that is, the weight matrix is of an order of magnitude with a crossbar in both the row and column dimensions. At this time, there is little difference in selecting the crossbar column pruning or the crossbar row pruning, so that either pruning can be selected at will.

Step 300: The first weight matrix is pruned according to the pruning scheme to obtain a second weight matrix. The second weight matrix is mapped to the crossbar array in an accelerator, and the neural network is accelerated by the accelerator. The present disclosure comprises three pruning schemes. Before pruning, it is necessary to determine the weight distribution matrix corresponding to each crossbar when the first weight matrix is mapped to the crossbar array in the accelerator, and then pruning is carried out according to the determined pruning scheme. The specific process is as follows.

(1) When the pruning scheme is crossbar row pruning, the row importance measurement factor of each row weight in the weight distribution matrix corresponding to each crossbar is determined. Then, the row weight with the row importance measurement factor less than the row threshold is deleted, and all the rows below the deleted row in the weight distribution matrix move upwards to the blank position where the deleted row is located to obtain the second weight matrix. The row threshold is adaptively adjustable. In the pruning process, considering that there is a crossbar whose cell is not full, pruning threshold is adjusted appropriately to keep more crossbar rows to fill the crossbar or delete more crossbar rows to release the whole crossbar.

Figure 7:
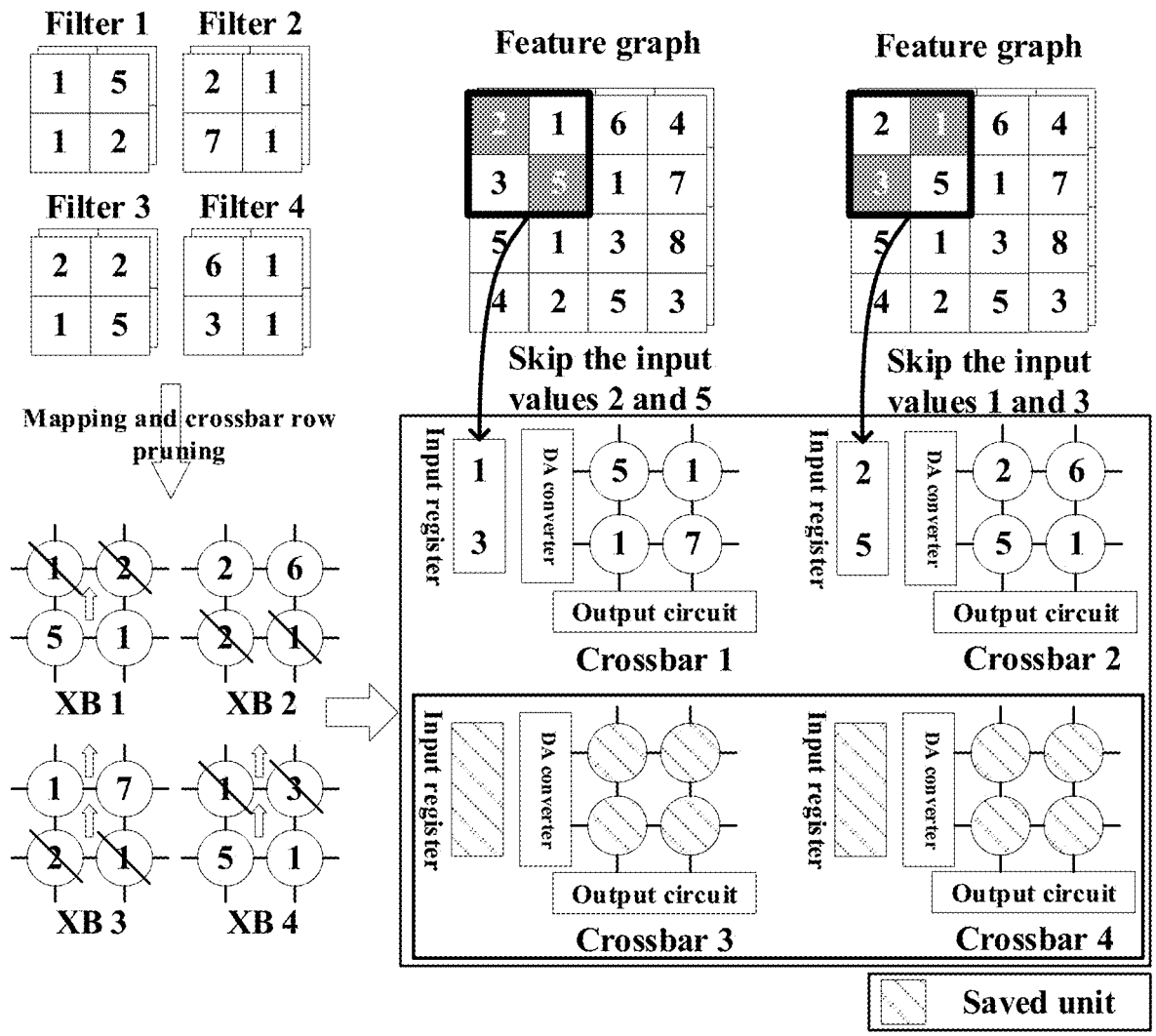
FIG. 7 is a schematic diagram of crossbar row pruning according to the present disclosure.

FIG. 7 is a schematic diagram of crossbar row pruning according to the present disclosure. As shown in FIG. 7, it is assumed that the weight before pruning consists of four 2*2 filters, which can be mapped on four 2*2 crossbars. At this time, the weight on a row inside the crossbar, that is, the crossbar row, is used as the basic pruning granularity for pruning. First, the row importance measure factor corresponding to each crossbar row, such as L1 norm, is calculated. Then, a global pruning threshold is determined according to the pruning rate, and the crossbar rows with importance lower than this threshold are deleted. At the same time, considering the alignment factor, in the present disclosure, the pruning threshold will be automatically adjusted to properly retain or delete some crossbar rows, so that the cells on the crossbar will not be idle after the final pruning result is mapped to the crossbar. In FIG. 7, when all the crossbar rows with L1 norm less than or equal to 3 are deleted at the beginning, the first row of XB1 and the second rows of XB2 and XB3 are all deleted, and the corresponding rows move upward. At this time, it is found that only one row is deleted in XB2 and XB4. After moving upward, one row of cells is occupied and one row of cells is released in XB4. Therefore, the pruning threshold is adjusted to 4 and the first row of XB4 is also deleted. Finally, when the pruned matrix is mapped to the crossbar array, it can be found that the remaining weights only need to occupy crossbar1 and crossbar2, while crossbar3 and crossbar4 can be completely released. Considering that a row in the crossbar corresponds to the same input and some rows are deleted after pruning, the corresponding input does not need to be read. For example, if the first row of XB1 and the second row of XB3 in FIG. 7 are deleted, the first element and the fourth element in the input need not be read.

(2) When the pruning scheme is crossbar column pruning, the column importance measurement factor of each column weight in the weight distribution matrix corresponding to each crossbar is determined. The column weight with the column importance measurement factor less than the column threshold is then deleted, and all the columns on the right side of the deleted column in the weight distribution matrix move leftwards to the blank position where the deleted column is located to obtain the second weight matrix. The column threshold is adjustable. In the pruning process, considering that there is a crossbar whose cell is not full, pruning threshold is adjusted appropriately to keep more crossbar columns to fill the crossbar or delete more crossbar columns to release the whole crossbar.

Figure 8:
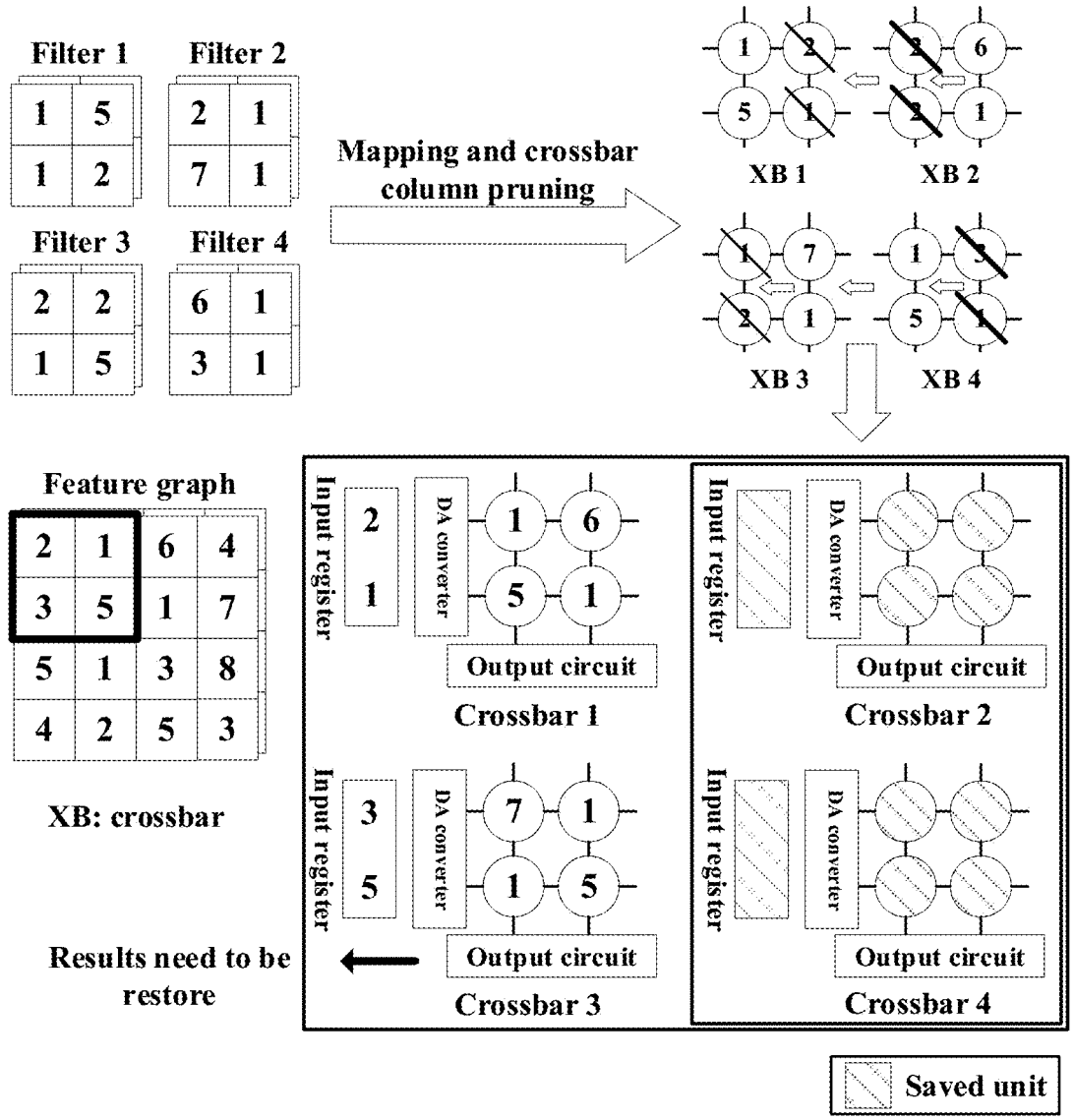
FIG. 8 is a schematic diagram of crossbar column pruning according to the present disclosure.

FIG. 8 is a schematic diagram of crossbar row pruning according to the present disclosure. As shown in FIG. 8, it is assumed that the weight before pruning consists of four 2*2 filters, which can be mapped on four 2*2 crossbars. At this time, the weight on a column inside the crossbar, that is, the crossbar column, is used as the basic pruning granularity for pruning. The column importance measure factor corresponding to each crossbar column, such as L1 norm, is calculated. Then, a global pruning threshold is determined according to the pruning rate, and the crossbar columns with importance lower than this threshold are deleted. At the same time, considering the alignment factor, the algorithm will appropriately retain or delete some crossbar columns, so that the cells on the crossbar will not be idle after the final pruning result is mapped to the crossbar. In FIG. 8, when all the crossbar columns with L1 norm less than or equal to 3 are deleted at the beginning, the second column of XB1 and the first column of XB3 are all deleted, and the corresponding columns move leftward. At this time, misalignment also occurs. Some cells are occupied and some cells are idle in some crossbars. Therefore, the pruning threshold is adjusted to 4, and the first column of XB2 and the second column of XB4 are deleted. Finally, when the pruned matrix is mapped to the crossbar array, it can be found that the remaining weights only need to occupy crossbar1 and crossbar3, while crossbar2 and crossbar4 can be completely released. However, after the crossbar column pruning, the position of the column in the crossbar is not the position of the column weight in the weight matrix. For example, the weight of the second column in crossbar1 is the weight of the fourth column before pruning, so that it is necessary to restore the output of the crossbar to its real position in the output circuit.

(3) When the pruning scheme is block-based structured pruning, the first weight matrix is uniformly divided into x*y blocks. The size of the block is larger than the size of the crossbar. The size of each crossbar is m*n, where m is the number of rows and n is the number of columns. The number of mapped crossbars in the crossbar array in the accelerator is x * y. Structured pruning is carried out on each block according to the size of the crossbar to obtain the second weight matrix. The size of the structured pruning for each block is equal to the size of the crossbar. During the structured pruning for each block, pruning is carried out in the way of first row last column or first column last row. First, an importance measure factor (such as L1/L2 norm, entropy, mean value, variance, APoZ, etc. of its associated activation) is calculated for each row (or column). A plurality of rows (or a plurality of columns) with the lowest importance measurement factors in each block are deleted according to the number of rows (or columns) of each crossbar, and the weights of m rows (or n columns) are reserved. Then, an importance measure factor (such as L1/L2 norm, entropy, mean value, variance, APoZ, etc. of its associated activation) is calculated for each column (or row). A plurality of rows (or a plurality of columns) with the lowest importance measurement factors in each block are deleted according to the number of rows (or columns) of each crossbar, and the weights of n columns (or m rows) are reserved to complete the structured pruning of each block. First row last column refers to row pruning first and then column pruning. First column last row refers to column pruning first and then row pruning. After pruning, the size of the weight retained in each block is m*n, so that it can be exactly mapped to a crossbar.

Figure 9:
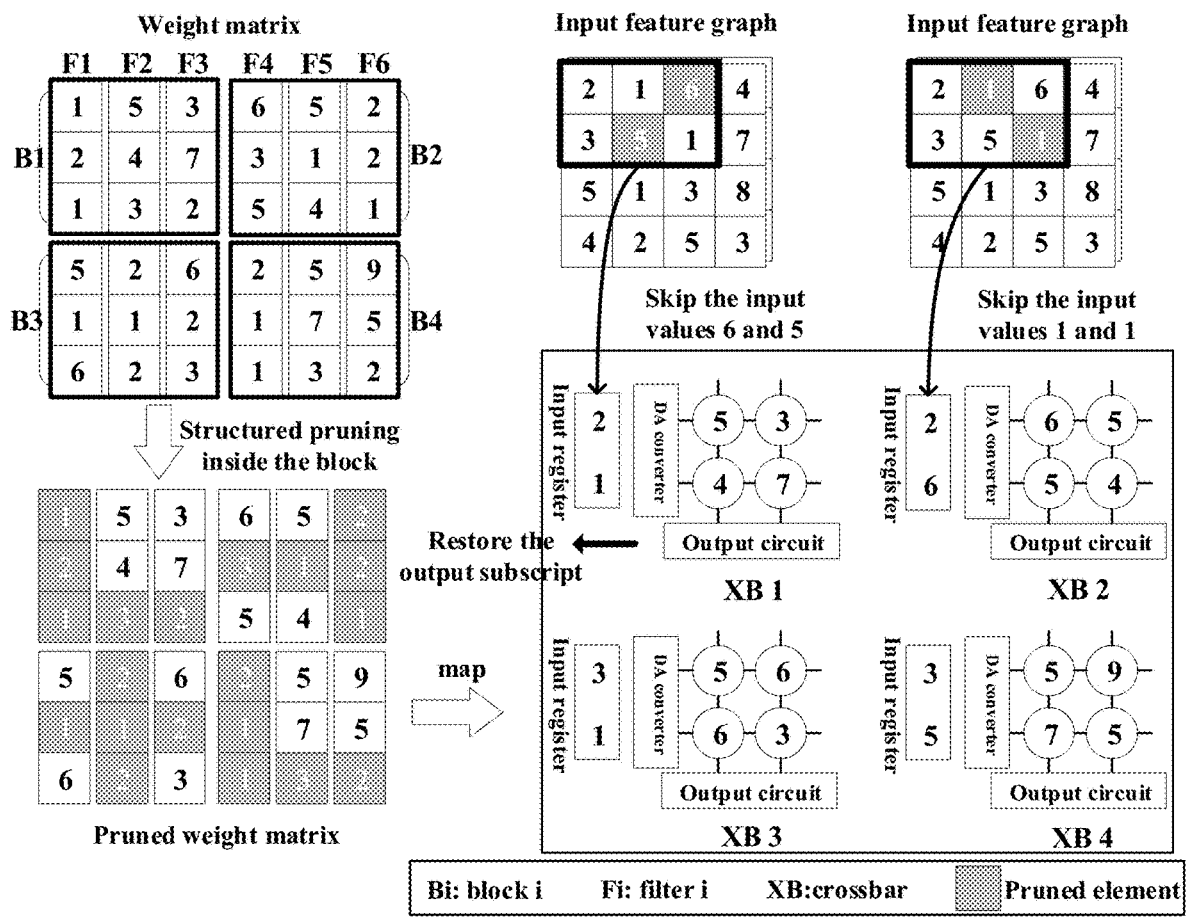
FIG. 9 is a schematic diagram of block-based structured pruning according to the present disclosure.

FIG. 9 is a schematic diagram of block-based structured pruning according to the present disclosure. As shown in FIG. 9, a 6*6 weight matrix is mapped to four 2*2 crossbars. First, the original weight matrix is uniformly divided into four blocks. Each block has a size of 3*3, that is, B1 to B4. In order to map each block to a crossbar, structured pruning is carried out inside each block, and a row and a column redundant inside the block are deleted. In FIG. 14, the first column and the third row of block 1 are deleted first, that is, the gray part in the figure, so that the size of the remaining weight in the block is 2*2. Each pruned block can now be mapped to exactly a crossbar. This process will produce sparsity in both row and column directions within the block. Considering row sparsity, for example, the third row of block 1 and the second row of block 3 are deleted, so that the third input and the fifth input in the original input can be deleted. Similarly, due to the sparsity in the column direction, the system needs to restore the output of the crossbar to its real position in the output circuit.

Figure 10:
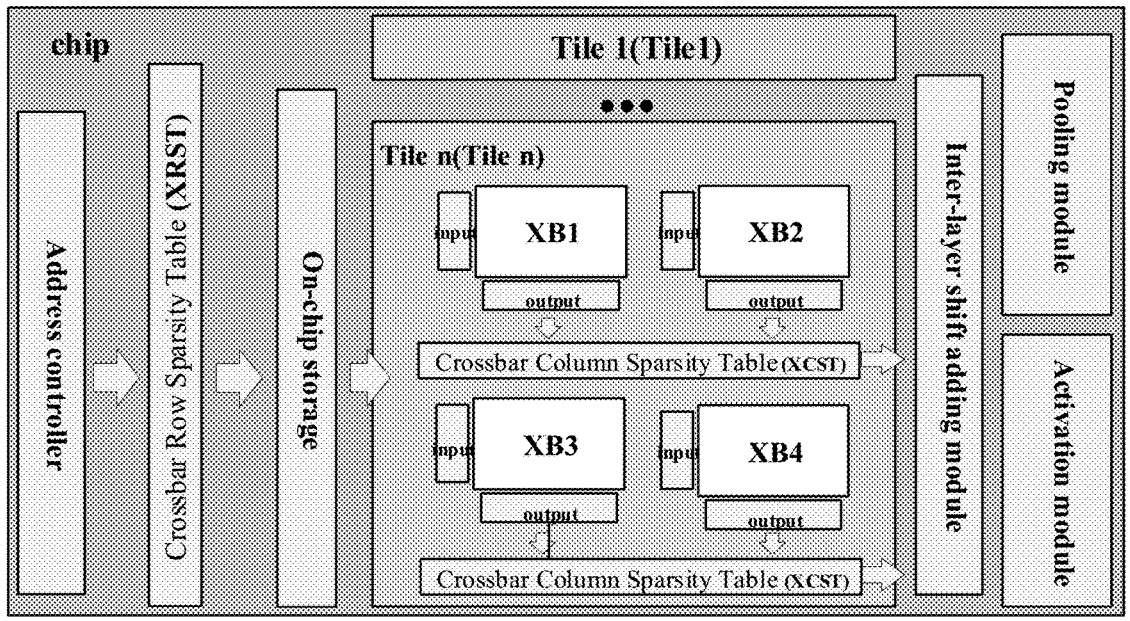
FIG. 10 is a schematic diagram of the data flow of a crossbar peripheral circuit according to the present disclosure.

When the pruning result obtained after pruning, that is, the second weight matrix, is mapped to the crossbar array, the sparsity in the row direction and the sparsity in the column direction will occur in the crossbar. In order to support these two types of sparsity, in the present disclosure, an XRST module and an XCST module are added on the basis of the original architecture, and both the XRST module and the XCST module are located in the crossbar peripheral circuit. FIG. 10 is a schematic diagram of the data flow of the crossbar peripheral circuit according to the present disclosure. As shown in FIG. 10, the XRST module is used in the input part to skip part of the input to support row sparsity, and the XCST module is used in the output part to support column sparsity.

Figure 11:
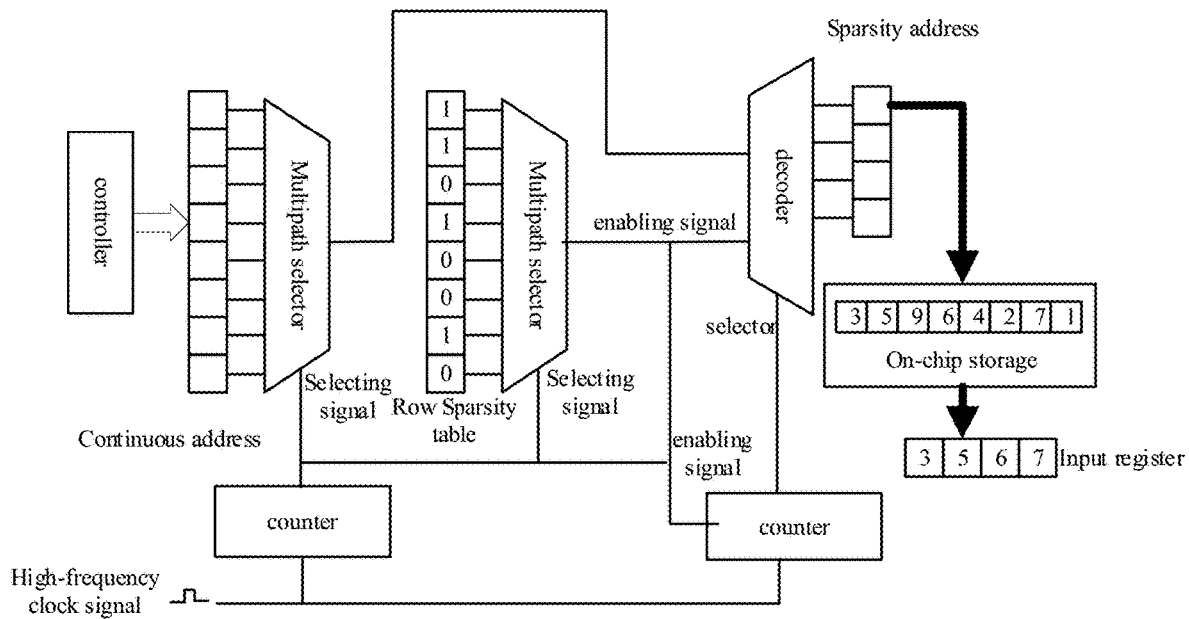
FIG. 11 is a hardware schematic diagram of an XRST module according to the present disclosure.

The pruned weight matrix will produce sparsity in the row direction in the crossbar, and a row weight in the crossbar corresponds to the same input. If a certain row weight is pruned, its corresponding input does not need to be read for calculation. In order to skip these unnecessary inputs, the row sparsity of a pruning model is recorded by the XRST module in hardware. FIG. 11 is a hardware schematic diagram of an XRST module according to the present disclosure. As shown in FIG. 11, the XRST module consists of many units that can write 0 or 1, the length of which is equal to the number of rows of the original weight matrix without pruning, wherein writing 0 for each unit indicates that the corresponding row weight is deleted, and writing 1 indicates that the corresponding row weight is retained. The number of 1 s in the XRST module is equal to the number of rows of weights in the crossbar. When reading input, if a certain unit of the XRST module is 0, it indicates that the corresponding row is deleted, and the corresponding input does not need to be read, so that the corresponding address can be deleted. Finally, a sparse address can be obtained, and then data can be read from the on-chip memory according to this sparse address.

Figure 12:
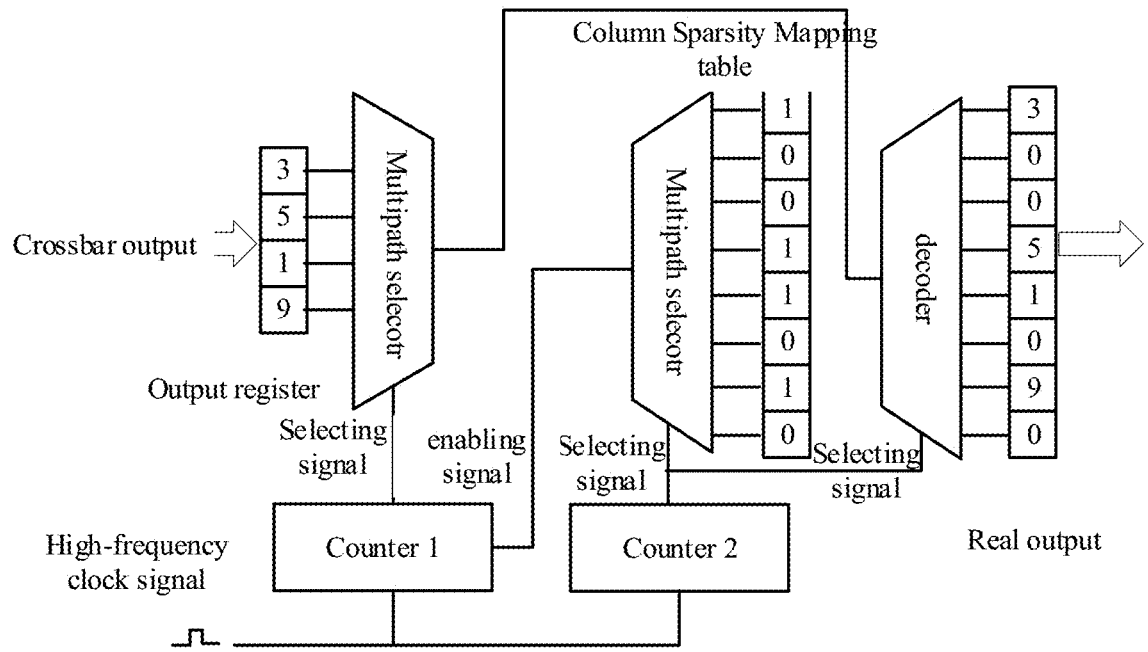
FIG. 12 is a hardware schematic diagram of an XCST module according to the present disclosure.

The pruned weight matrix will produce sparsity in the column direction of the crossbar, that is, the position of a column weight in the crossbar is not its position in the initial weight matrix. Because a filter is often distributed on multiple crossbars, in order to accumulate the results among crossbars, it is necessary to restore the calculated results of each column in each crossbar to its real position in the real output. In the present disclosure, this function is supported by the XCST module. FIG. 12 is a hardware schematic diagram of an XCST module according to the present disclosure. As shown in FIG. 12, the XCST module consists of many units that can write 0 or 1, the length of which is equal to the number of columns of the original weight matrix without pruning, wherein writing 0 for each unit indicates that the corresponding column weight is deleted, and writing 1 indicates that the corresponding column weight is retained. The number of 1 s in the XCST module is equal to the number of columns of weights in the crossbar. The pruned weight matrix will be sent to the crossbar to participate in the calculation and produce a pruned result. The hardware XCST module inserts 0 in the corresponding position of the output to restore the real position of each output.

According to the present disclosure, the XRST module and the XCST module are additionally designed on hardware to support row sparsity and column sparsity in the crossbar, respectively. Due to the existence of row sparsity, some elements in the original input need to be skipped. The XRST module in the system records the row sparsity inside the crossbar and instructs the system to skip the specified input. Due to the existence of the column sparsity, the position of each element in the output of the crossbar is not its real position, so that the system uses the XCST module to insert 0 in the output of the crossbar to restore each output to its real position in the original weight matrix.

Figure 13:
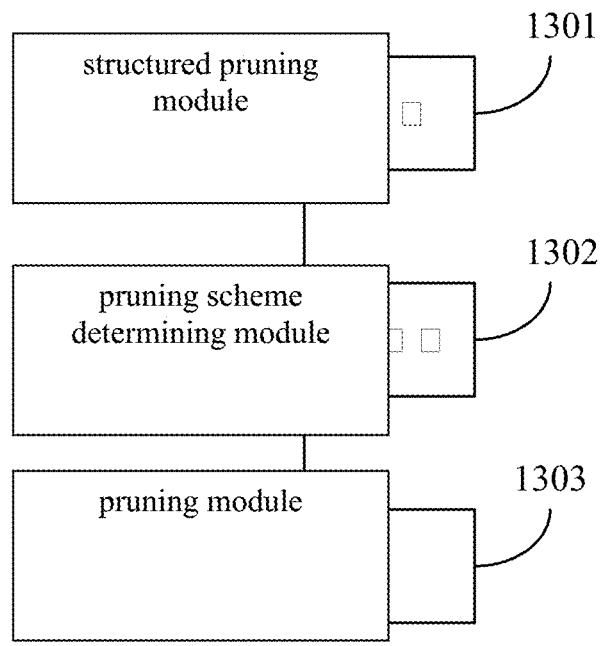
FIG. 13 is a schematic structural diagram of a pruning system based on a crossbar architecture according to the present disclosure.

According to the pruning method based on a crossbar architecture, the present disclosure further provides a pruning system based on a crossbar architecture. FIG. 13 is a schematic structural diagram of a pruning system based on a crossbar architecture according to the present disclosure. As shown in FIG. 13, the pruning system based on the crossbar architecture according to the present disclosure comprises the following structures: a structured pruning module 1301, which is configured to carry out structured pruning on a weight matrix to be processed at the current layer of a neural network without considering architecture factors to obtain a first weight matrix, wherein the weight matrix is the weight matrix of the neural network; a pruning scheme determining module 1302, which is configured to determine the pruning scheme according to the size of the first weight matrix and the size of the crossbar, wherein the pruning scheme comprises: block-based structured pruning, crossbar row pruning and crossbar column pruning; and a pruning module 1303, which is configured to prune the first weight matrix according to the pruning scheme to obtain a second weight matrix, wherein the second weight matrix is mapped to the crossbar array in an accelerator, and the neural network is accelerated by the accelerator.

As another embodiment, the pruning system based on the crossbar architecture according to the present disclosure further comprises: a post-processing module, which is configured to subsequent to carrying out structured pruning on a weight matrix to be processed at the current layer of a neural network without considering architecture factors to obtain a first weight matrix, when the kth filter of the current layer is deleted, delete the weight of the kth channel in the next layer of the current layer; and when the kth channel of the current layer is deleted, delete the kth filter in the previous layer of the current layer.

As another embodiment, the pruning scheme determining module 1302 in the pruning system based on the crossbar architecture according to the present disclosure specifically comprises: a first numerical value calculation unit, which is configured to calculate the ratio of the width of the first weight matrix to the width of the crossbar to obtain a first numerical value; a second numerical value calculation unit, which is configured to calculate the ratio of the height of the first weight matrix to the height of the crossbar to obtain a second numerical value; a comparing unit, which is configured to compare the size relationship between the first numerical value and the ratio threshold and the size relationship between the second numerical value and the ratio threshold; a first pruning scheme determining unit, which is configured to, when the first numerical value is greater than the ratio threshold and the second numerical value is greater than the ratio threshold, determine the block-based structured pruning as a pruning scheme; a second pruning scheme determining unit, which is configured to, when the first numerical value is great than the ratio threshold and the second numerical value is not greater than the ratio threshold, determine the crossbar column pruning as a pruning scheme; a third pruning scheme determining unit, which is configured to, when the first numerical value is not great than the ratio threshold and the second numerical value is larger than the ratio threshold, determine the crossbar row pruning as a pruning scheme; a fourth pruning scheme determining unit, which is configured to, when the first numerical value is smaller than the ratio threshold and the second numerical value is smaller than the ratio threshold, determine the crossbar column pruning or the crossbar row pruning as a pruning scheme.

As another embodiment, the pruning module 1303 in the pruning system based on the crossbar architecture according to the present disclosure specifically comprises: a mapping determination unit, which is configured to determine a weight distribution matrix corresponding to each crossbar when the first weight matrix is mapped to a crossbar array in the accelerator; a block dividing unit, which is configured to uniformly divide the first weight matrix into x*y blocks when the pruning scheme is block-based structured pruning, wherein the size of the block is larger than the size of the crossbar, and the number of mapped crossbars in the crossbar array in the accelerator is x*y; a first pruning unit, which is configured to carry out structured pruning on each block according to the size of the crossbar to obtain the second weight matrix; a column importance measurement factor determining unit, which is configured to, when the pruning scheme is crossbar column pruning, determine the column importance measurement factor of each column weight in the weight distribution matrix corresponding to each crossbar; a second pruning unit, which is configured to delete the column weight with the column importance measurement factor smaller than the column threshold, and move all the columns on the right side of the deleted column in the weight distribution matrix leftwards to the blank position where the deleted column is located to obtain the second weight matrix, wherein the column threshold is adjustable; a row importance measurement factor determining unit, which is configured to, when the pruning scheme is crossbar row pruning, determine the row importance measurement factor of each row weight in the weight distribution matrix corresponding to each crossbar; a third pruning unit, which is configured to delete the row value with the row importance measurement factor smaller than the row threshold, and move all the rows below the deleted row in the weight distribution matrix upwards to the blank position where the deleted row is located to obtain the second weight matrix, wherein the row threshold is adjustable.

As another embodiment, the pruning system based on the crossbar architecture according to the present disclosure further comprises: an XRST module, which is configured to record the row sparsity of the second weight matrix subsequent to pruning the first weight matrix according to the pruning scheme to obtain a second weight matrix, wherein the XRST module is located in the peripheral circuit of the crossbar, and the XRST module is configured to skip the input corresponding to the deleted row according to the row sparsity of the second weight matrix; an XCST module, which is configured to record the column sparsity of the second weight matrix, wherein the XCST module is located in the peripheral circuit of the crossbar, and the XCST module is configured to insert 0 into the output position corresponding to the deleted column according to the column sparsity of the second weight matrix, so as to restore the real positions of all outputs.

In this specification, each embodiment is described in a progressive manner, and each embodiment focuses on the differences from other embodiments. It is sufficient to refer to the same and similar parts among each embodiment. Because the system disclosed in the embodiment corresponds to the method disclosed in the embodiment, the description is relatively simple, and the relevant points can be found in the description of the method.

In the present disclosure, a specific example is applied to illustrate the principle and implementation of the present disclosure, and the explanation of the above embodiments is only used to help understand the method and its core idea of the present disclosure. At the same time, according to the idea of the present disclosure, there will be some changes in the specific implementation and application scope for those skilled in the art. To sum up, the contents of this specification should not be construed as limiting the present disclosure.

What is claimed is:

1. A pruning method based on a crossbar architecture, comprising:

carrying out structured pruning on a weight matrix to be processed at a current layer of a neural network without considering architecture factors to obtain a first weight matrix, wherein the weight matrix is the weight matrix of the neural network;

determining a pruning scheme according to a size of the first weight matrix and a size of a crossbar, wherein the pruning scheme comprises: block-based structured pruning, crossbar row pruning and crossbar column pruning; and pruning the first weight matrix according to the pruning scheme to obtain a second weight matrix, wherein the second weight matrix is mapped to a crossbar array in an accelerator, and the neural network is accelerated by the accelerator;

wherein determining the pruning scheme according to the size of the first weight matrix and the size of the crossbar comprises:

calculating a ratio of a width of the first weight matrix to a width of the crossbar to obtain a first numerical value;

calculating a ratio of a height of the first weight matrix to a height of the crossbar to obtain a second numerical value;

comparing a size relationship between the first numerical value and a ratio threshold and the size relationship between the second numerical value and the ratio threshold;

when the first numerical value is greater than the ratio threshold and the second numerical value is greater than the ratio threshold, determining the block-based structured pruning as a pruning scheme;
when the first numerical value is great than the ratio threshold and the second numerical value is not greater than the ratio threshold, determining the crossbar column pruning as a pruning scheme;
when the first numerical value is not greater than the ratio threshold and the second numerical value is larger than the ratio threshold, determining the crossbar row pruning as a pruning scheme; and
when the first numerical value is smaller than the ratio threshold and the second numerical value is smaller than the ratio threshold, determining the crossbar column pruning or the crossbar row pruning as a pruning scheme.

2. The pruning method based on a crossbar architecture according to claim 1, wherein subsequent to carrying out structured pruning on a weight matrix to be processed at the current layer of a neural network without considering architecture factors to obtain a first weight matrix, the method further comprises:
post-processing the neural network according to the first weight matrix of the current layer and compressing the neural network.

3. The pruning method based on a crossbar architecture according to claim 2, wherein post-processing the neural network according to the first weight matrix of the current layer and compressing the neural network comprises:
when a kth filter of the current layer is deleted, deleting the weight of a kth channel in a next layer of the current layer; and
when the kth channel of the current layer is deleted, deleting the kth filter in a previous layer of the current layer.

4. The pruning method based on a crossbar architecture according to claim 1, wherein pruning the first weight matrix according to the pruning scheme to obtain a second weight matrix comprises:
determining a weight distribution matrix corresponding to each crossbar when the first weight matrix is mapped to the crossbar array in the accelerator;
uniformly dividing the first weight matrix into x*y blocks when the pruning scheme is the block-based structured pruning, wherein the size of the block is larger than the size of the crossbar, and a number of mapped crossbars in the crossbar array in the accelerator is x * y, wherein x and y are both integers greater than zero;
carrying out structured pruning on each block according to the size of the crossbar to obtain the second weight matrix;
when the pruning scheme is the crossbar column pruning, determining a column importance measurement factor of each column weight in the weight distribution matrix corresponding to each crossbar;
deleting a column weight with the column importance measurement factor smaller than a column threshold, and moving all columns on a right side of the a deleted column in the weight distribution matrix leftwards to a blank position where the deleted column is located to obtain the second weight matrix, wherein the column threshold is adjustable;
when the pruning scheme is the crossbar row pruning, determining a row importance measurement factor of each row weight in the weight distribution matrix corresponding to each crossbar; and
deleting a row value with the row importance measurement factor smaller than a row threshold, and moving all rows below a deleted row in the weight distribution matrix upwards to the blank position where the deleted row is located to obtain the second weight matrix, wherein the row threshold is adjustable.

5. The pruning method based on a crossbar architecture according to claim 4, wherein in the process of carrying out structured pruning on each block according to the size of the crossbar to obtain the second weight matrix, a size of a structured pruning for each block is equal to the size of the crossbar.

6. The pruning method based on a crossbar architecture according to claim 1, wherein subsequent to pruning the first weight matrix according to the pruning scheme to obtain a second weight matrix, the method further comprises:
using an XRST module to record a row sparsity of the second weight matrix, wherein the XRST module is located in a peripheral circuit of the crossbar, and the XRST module is configured to skip an input corresponding to a deleted row according to the row sparsity of the second weight matrix, wherein XRST represents crossbar row sparsity table; and
using an XCST module to record a column sparsity of the second weight matrix, wherein the XCST module is located in the peripheral circuit of the crossbar, and the XCST module is configured to insert 0 into an output position corresponding to a deleted column according to the column sparsity of the second weight matrix, so as to restore real positions of all outputs, wherein XCST represents crossbar column sparsity table.

* * * * *